United States Patent
Wood et al.

(10) Patent No.: US 6,547,840 B2
(45) Date of Patent: *Apr. 15, 2003

(54) CANDLE WAX STABILIZED WITH IMIDAZOLIDINES

(75) Inventors: Mervin G. Wood, Poughquag, NY (US); Andrea R. Smith, Wingdale, NY (US); Deborah DeHessa, Poughkeepsie, NY (US)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/824,048

(22) Filed: Apr. 2, 2001

(65) Prior Publication Data

US 2002/0194776 A1 Dec. 26, 2002

(51) Int. Cl.$^7$ .................................................. C11C 5/00
(52) U.S. Cl. ......................................... 44/275; 431/288
(58) Field of Search ............................. 44/275; 431/288

(56) References Cited

U.S. PATENT DOCUMENTS

| | | | |
|---|---|---|---|
| 3,530,084 A | 9/1970 | Potts .......................... | 260/28.5 |
| 4,379,721 A | 4/1983 | Qualitz et al. ................. | 106/21 |
| 4,448,969 A | 5/1984 | Ramey et al. ............... | 548/301 |
| 4,616,051 A | 10/1986 | Paolino ....................... | 524/102 |
| 4,804,717 A | 2/1989 | Ramey et al. ............... | 525/375 |
| 4,895,901 A | 1/1990 | Ramey et al. ............... | 525/127 |
| 5,879,694 A | 3/1999 | Morrison et al. ........... | 424/405 |
| 5,964,905 A | 10/1999 | Camp et al. .................. | 44/275 |
| 6,020,491 A | 2/2000 | Wonley et al. ............... | 544/220 |
| 6,262,153 B1 * | 7/2001 | Webster ........................ | 524/99 |
| 6,296,674 B1 * | 10/2001 | Trainor et al. ................. | 44/275 |

FOREIGN PATENT DOCUMENTS

| | | |
|---|---|---|
| EP | 0005922 | 12/1979 |
| EP | 0359488 | 3/1990 |
| EP | 0133964 | 7/1990 |
| EP | 0313941 | 1/1993 |
| GB | 1145470 | 3/1969 |
| JP | 3278554 | 12/1991 |
| WO | 94/13736 | 6/1994 |
| WO | 98/30601 | 7/1998 |
| WO | 99/61396 | 12/1999 |
| WO | 00/22037 | 4/2000 |

OTHER PUBLICATIONS

F. Ballentine et al., "Inhibiting Color Fading of Dyed Candles with CYASORB® Light Absorbers", The National Candle Association Technical Meeting, Apr. 16, 1998.
Abstract for JP 3278554 (1991).
Ullmann's Encyclopedia of Industrial Chemistry, vol. A5, pp. 29–30.
R. van der Vennet, The National Candle Association Meeting in Houston, (1994), "Antioxidants in Wax–Replacement of BHT"—Described In WO/94 13736.

* cited by examiner

*Primary Examiner*—Margaret Medley
(74) *Attorney, Agent, or Firm*—Tyler A. Stevenson; Luther A. R. Hall

(57) ABSTRACT

White, dyed, dipped, unscented and/or scented candle wax is effectively stabilized against discoloration and fading by the incorporation therein of an imidazolidine in combination with a UV absorber and/or an antioxidant.

20 Claims, No Drawings

CANDLE WAX STABILIZED WITH IMIDAZOLIDINES

The instant invention pertains to white, dyed, dipped, unscented and/or scented candle wax which is effectively stabilized against discoloration and fading by the incorporation therein of an imidazolidine in combination with a UV absorber and/or an antioxidant.

BACKGROUND OF THE INVENTION

Candles have been known for many centuries going back to the eighth century B.C. The nature of candles is described in Ullmann's Encyclopedia of Industrial Chemistry, Volume A5 at pages 29–30 where it is seen that candles are made from paraffin, beeswax and stearin as basic materials, and where a host of additives may also be present.

It is not surprising that with candles and wax becoming increasingly more important attention was paid as to how to stabilize the said materials. At the National Candle Association Meeting in Houston, 1994, R. van der Vennet presented a paper on "Antioxidants in Wax—Replacement of BHT" touting the use of Vitamin E (tocopherol) as an antioxidant to prevent the yellowing of wax when oxidized. WO 94/13736 describes the same invention.

EP 359,488 A3 and EP 133,964 B1 describe stabilized waxes used in cosmetics where the waxes are the same or similar to those used in candles.

EP 5,922 A1 describes lip cosmetics where the waxes are useful in lipsticks and are related to those useful in candles.

U.S. Pat. No. 5,879,694 describes in detail transparent gel candles both in composition and structure. The use of BHT as an antioxidant is mentioned.

At the National Candle Association Technical Meeting on Apr. 16, 1998, F. A. Ballentine et al., presented a paper entitled "Inhibiting Color Fading of Dyed Candles with CYASORB® Light Absorbers" in which the general theories of thermal oxidation and photodegradation are discussed along with data on the effect of light absorbers on color stability of dyed candle waxes. The light absorbers compared are 4-octyloxy-2-hydroxy-benzophenone UV-531; 4-methoxy-2-hydroxybenzophenone UV-9; 2-(2-hydroxy-5-methylphenyl)-2H-benzotriazole UV-5365; 2-(2-hydroxy-5-tert-octylphenyl-2H-benzotriazole UV-5411 and 2-(2-hydroxy-3,5-di-tert-amylphenyl)-2H-benzotriazole UV-2337).

U.S. Pat. No. 5,964,905 teaches dyed and scented candle gels containing triblock copolymers and a hydrocarbon oil of high flash point. This reference teaches that a light (UV) absorber may be used to improve the shelf stability of the candle color when exposed to visible or ultraviolet light. Two preferred absorbers are ethylhexyl p-methoxycinnamate (PARSOL® MCX, Roche) and 2-(2-hydroxy-5-tert-octylphenyl)-2H-benzotriazole (CYASORB® 5411, Cytec).

Imidazolidines have been known as stabilizers for various substrates. British Patent No. 1,145,470 teaches the stabilization of polyolefins using alkylated 4-oxoimidazolidine-1-oxides such as 2,2,5,5-tetramethyl-4-oxoimidazolidine-1-oxide.

U.S. Pat. No. 4,448,969 discloses the use of cyclic ether or carbonate alkylation products of 2,2,5,5-tetramethylimidazolidin-4-one for the stabilization of synthetic polymers, particularly polyolefins.

U.S. Pat. Nos. 4,804,717 and 4,895,901 teach that polymeric hindered amine light stabilizers are useful for the stabilization of olefin, styrene and acrylate polymers which contain a minor amount of a pendant moiety derived from 3-hydroxy-2,2,5,5-tetramethylimidazolidine-4-one.

European Patent Specification 313,941 B1 describes the stabilization of photochromic dye compositions using 1-oxyl-2,2,5,5-tetramethylimidazolidin-4-one.

WO 00/22037 teaches the stabilization of solid, shaped and colored wax articles, including candles, using a malonate UV absorber which may optionally contain a hindered amine moiety as part of the malonate compound structure. The wax articles are dyed with a variety of oil soluble dyes and pigments. The samples protected by dimethyl p-methoxy-benzylidinemalonate exhibited better resistance to discoloration that did samples stabilized with selected benzotriazole or benzophenone UV absorbers.

Japanese Hei 3-278554 teaches that wax crayons (drawing materials) colored by organic pigments can be stabilized by a hindered amine and/or benzotriazole.

U.S. Pat. No. 6,020,491 teaches the use of monomeric and polymeric cyclic amine and N-halamine compounds as biocides and disinfectants for a host of substrates. Some of the structures include a substituted 2,2,5,5-tetramethylimidazolidine moiety in a pendant group.

WO 98/30601 describes a method of controlling polymer molecular weight and polymer structure by living free radical polymerization where nitroxide and alkoxyamine containing a 2,2,5,5-tetramethylimidazolidine moiety are employed.

WO 99/61396 teaches the method of stabilizing unsaturated organic polymers using a host of polymerization inhibitors based on the alkylated 2,2,5,5-tetramethylimidazolidine compounds.

In respect to wax stabilization, the use of selected hindered amines and/or benzotriazole UV absorbers is also known in the prior art as seen in U.S. Pat. Nos. 3,530,084; 4,379,721; 4,616,051 and 5,964,905 and in copending applications Ser. Nos. 09/495,495, 09/495,496 and 09/741,583.

None of these references teach the superior performance provided when the imidazolidine compounds are used in conjunction with a UV absorber and/or antioxidant to stabilize candle wax.

OBJECTS OF THE INVENTION

The object of the invention is to provide for a white and unscented; white and scented; dyed and unscented; dyed and scented; dipped and unscented; or dipped and scented candle wax stabilized by a combination of an imidazolidine compound with a UV absorber and/or antioxidant.

DETAILED DISCLOSURE

The instant invention pertains to a composition which comprises (a) candle wax which is white and unscented; white and scented; dyed and unscented; dyed and scented; dipped and unscented; or dipped and scented, and (b) an effective stabilizing amount of a combination of
  (i) an imidazolidine compound containing a moiety of generic formula I

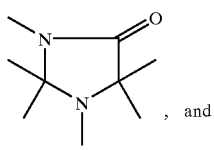

(ii) a UV absorber or an antioxidant, or a UV absorber and an antioxidant wherein the ratio by weight of (i) to (ii) is from 10:1 to 1:10.

In another embodiment of the instant invention, the imidazolidine compound of component (b)(i) is a compound of formula Ia

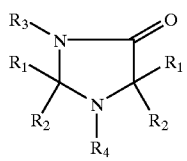

where

R₁ and R₂ are independently alkyl of 1 to 8 carbon atoms, or R₁ and R₂ together are tetramethylene, pentamethylene or pentamethylene substituted by methyl; and R₃ and R₄ are independently hydrogen, oxyl, hydroxyl, aralkyl of 7 to 15 carbon atoms, alkoxy of 1 to 24 carbon atoms, alkyl of 1 to 42 carbon atoms, said alkyl substituted by one or two hydroxyl groups, said alkyl substituted by alkylcarbonyloxy of 2 to 18 carbon atoms, or said alkyl interrupted by one to twenty oxygen atoms and substituted by one hydroxyl, by alkylcarbonyloxy of 2 to 18 carbon atoms or by 4-hydroxy-3,5-di-tert-butylbenzoyloxy.

In another embodiment of the invention R₁ and R₂ are each methyl, or R₁ and R₂ together are pentamethylene.

Specific imidazolidine compounds of formula I or Ia which are useful in the instant invention include (a) 2,2-pentamethylene-5,5-pentamethylene-imidazolidin-4-one;

(b) 2,2-pentamethylene-5,5-pentamethylene-imidazolidin-4-one-1-oxyl;

(c) 2,2,5,5-tetramethyl-4-oxoimidazoline-1-oxyl;

(d) 2,5-dimethyl-2,5-diisobutyl-4-oxoimidazoline-1-oxyl;

(e) (2,2,6,6-tetramethylpiperidine-1-oxyl)-4-spiro-2'-(4-oxoimidiazoline-1-oxyl)-5'-spiro-4-(2,2,6,6-tetramethylpiperidine-1-oxyl);

(f) 2,5-dimethyl-2,5-diethyl-4-oxoimidazoline-1-oxyl;

(g) 2,2-[(1-methyl)-1,5-pentanediyl]-5,5-[(1-methyl)-1,5-pentanediyl]-imidazo-lidin-4-one-1-oxyl;

(h) 2,2,5,5-tetramethyl-1-(2-hydroxyethyl)-imidazolin-4-one;

(i) bis-[2-(2,2,5,5-tetramethyl-4-oxo-imidazolin-1-yl)ethyl] sebacate;

(j) 2,2,5,5-tetramethyl-1-methyl-3-(2-hydroxyethyl)-imidazolin-4-one;

(k) 2,2,5,5-tetramethyl-1-methyl-3-[H(OCH₂CH₂)$_x$]-imidazolin-4-one where x is 2 to 21;

(l) 2,2,5,5-tetramethyl-1-methyl-3-[heptadecylcarbonyl(OCH₂CH₂)$_x$]-imidazolin-4-one where x is 2 to 21;

(m) 2,2,5,5-tetramethyl-1-methyl-3-[4-hydroxy-3,5-di-tert-butylbenzoyl-(OCH₂CH₂)$_x$]-imidazolin-4-one where x is 2 to 21;

(n) 2,2,5,5-tetramethyl-1-methyl-3-[2-(heptadecylcarbonyloxyethyl]-imidazolin-4-one;

(o) 2,2,5,5-tetramethyl-3-methyl-1-[2-(heptadecylcarbonyloxyethyl]-imidazolin-4-one;

(p) the transesterification product of a 1:1 methyl methacrylate:ethyl acrylate copolymer with 3-hydroxyethyl-2,2,5,5-tetramethylimidazolidin-4-one; or (q) the transesterification product of a 2:1 methyl methacrylate:ethyl acrylate copolymer with 3-hydroxyethyl-2,2,5,5-tetramethylimidazolidin-4-one.

Another embodiment of the instant invention is where the imidazoline compound of component (b)(i) is 2,2-pentamethylene-5,5-pentamethylene-imidazolidin-4-one.

In another embodiment of the invention, the ratio by weight of (i) to (ii) is from 4:1 to 1:4.

Another embodiment of the invention is where the ratio by weight of (i) to (ii) is from 2:1 to 1:2.

In still another embodiment of the invention, the effective amount of the UV absorber plus the imidazoline compound in the candle wax is 0.01 to 10% by weight based on the wax.

Another embodiment of the invention is where the effective amount of the UV absorber plus imidazolidine in the candle wax is 0.1 to 2% by weight based on the wax.

Another embodiments of the invention is where the effective amount of the UV absorber plus imidazolidine in the candle wax is 0.1 to 0.5% by weight based on the wax.

The UV absorber of component (ii) is a benzotriazole, a benzophenone, an α-cyanoacrylate, an oxanilide, an s-triazine, a cinnamate, a malonate, a benzoate or a salicylate, or a mixture thereof.

In another embodiment of the invention, the UV absorber is a benzotriazole, a benzophenone or an s-triazine.

Examples of the UV absorbers useful in the instant invention are (a) 4-octyloxy-2-hydroxybenzophenone;

(b) 4-methoxy-2-hydroxybenzophenone;

(c) 2-(2-hydroxy-5-methylphenyl)-2H-benzotriazole;

(d) 2-(2-hydroxy-5-tert-octylphenyl-2H-benzotriazole;

(e) 2-(2-hydroxy-3,5-di-tert-amylphenyl)-2H-benzotriazole;

(f) octyl 3-(benzotriazol-2-yl)-5-tert-butyl-4-hydroxyhydrocinnamate;

(g) 2-(2-hydroxy-3,5-di-tert-butylphenyl)-2H-benzotriazole;

(h) 2-(2-hydroxy-5-tert-butylphenyl)-2H-benzotriazole;

(i) 5-chloro-2-(2-hydroxy-3,5-di-tert-butylphenyl)-2H-benzotriazole;

(j) 5-chloro-2-(2-hydroxy-3-tert-butyl-5-methylphenyl)-2H-benzotriazole;

(k) 2-(2-hydroxy-3-sec-butyl-5-tert-butylphenyl)-2H-benzotriazole;

(l) 2-(2-hydroxy-4-octyloxyphenyl)-2H-benzotriazole;

(m) 2-(2-hydroxy-3-dodecyl-5-methylphenyl)-2H-benzotriazole;

(n) 2-[2-hydroxy-3,5-di(α,α-dimethylbenzyl)phenyl]-2H-benzotriazole;

(o) 2-[2-hydroxy-3-(α,α-dimethylbenzyl)-5-tert-octylphenyl]-2H-benzotriazole;

(p) 2-{2-hydroxy-3-tert-butyl-5-[2-(omega-hydroxy-octa(ethyleneoxy)carbonyl)-ethyl]phenyl}-2H-benzotriazole; and (q) 2-{2-hydroxy-3-tert-butyl-5-[2-(octyloxy)carbonyl) ethyl]phenyl}-2H-benzotriazole.
(r) 2-ethylhexyl p-methoxycinnamate;
(s) 4-methoxy-2,2'-dihydroxybenzophenone;
(t) 4,4'dimethoxy-2,2'-dihydroxybenzophenone;
(u) 2,4-bis(2,4-dimethylphenyl)-6-(2-hydroxy-4-octyloxyphenyl)-s-triazine;
(v) 2,4-diphenyl-6-(2-hydroxy-4-hexyloxyphenyl)-s-triazine;
(w) 2,4-bis(2,4-dimethylphenyl)-6-[2-hydroxy-4-(3-do-/tri-decyloxy-2-hydroxy-propoxy)phenyl]-s-triazine;
(x) 2,4-bis(2,4-dimethylphenyl)-6-[2-hydroxy-4-(3-do-/tri-decyloxy-2-hydroxy-propoxy)-5-α-cumylphenyl]-s-triazine;
(y) reaction product of 2,4,6-tris(2,4-dihydroxyphenyl)-s-triazine with octyl α-haloacetate; or
(z) the mixture of 3,3;3,5;5,5-methylene-bis[2,4-bis(2,4-dimethyl-phenyl)]-6-[2-hydroxy-4-(3-butyloxy-2-hydroxypropoxyphenyl)]-s-triazine.

Still other examples of UV absorbers useful in the instant invention are (a) 4-octyloxy-2-hydroxybenzophenone;
(b) 4-methoxy-2-hydroxybenzophenone;
(d) 2-(2-hydroxy-5-tert-octylphenyl-2H-benzotriazole;
(o) 2-[2-hydroxy-3-(α,α-dimethylbenzyl)-5-tert-octylphenyl]-2H-benzotriazole;
(p) 2-{2-hydroxy-3-tert-butyl-5-[2-(omega-hydroxy-octa (ethyleneoxy)carbonyl)-ethyl]phenyl}-2H-benzotriazole;
(q) 2-{2-hydroxy-3-tert-butyl-5-[2-(octyloxy)carbonyl) ethyl]phenyl}-2H-benzotriazole;
(y) reaction product of 2,4,6-tris(2,4-dihydroxyphenyl)-s-triazine with octyl α-haloacetate; or
(z) the mixture of 3,3;3,5;5,5-methylene-bis[2,4-bis(2,4-dimethyl-phenyl)]-6-[2-hydroxy-4-(3-butyloxy-2-hydroxypropoxyphenyl)]-s-triazine.

Another embodiment of the instant invention involves a composition wherein the antioxidant is a phenolic antioxidant, phosphite, nitrone, amine oxide or hydroxylamine, or mixture thereof.

Examples of the above-embodiment are wherein the effective amount of UV absorber in combination with the imidazolidine compound and an antioxidant is 0.01 to 10% by weight based on the wax.

Another embodiment is where the effective amount of UV absorber in combination with the imidazolidine and an antioxidant is 0.1 to 2% by weight based on the wax.

Still another embodiment is where the effective amount of UV absorber in combination with the imidazolidine and an antioxidant is 0.1 to 0.5% by weight based on the wax.

Examples of the antioxidants useful in this invention are
n-octadecyl 3,5-di-tert-butyl-4-hydroxyhydrocinnamate,
neopentanetetrayl tetrakis(3,5-di-tert-butyl-4-hydroxyhydrocinnammate),
di-n-octadecyl 3,5-di-tert-butyl-4-hydroxybenzylphosphonate,
1,3,5-tris(3,5-di-tert-butyl-4-hydroxybenzyl) isocyanurate,
thiodiethylene bis(3,5-di-tert-butyl-4-hydroxyhydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol,
2,2'-ethylidene-bis(4,6-di-tert-butylphenol),
1,3,5-tris(2,6-dimethyl-4-tert-butyl-3-hydroxybenzyl) isocyanurate,
1,1,3,-tris(2-methyl-4-hydroxy-5-tert-butylphenyl) butane,
1,3,5-tris[2-(3,5-di-tert-butyl-4-hydroxyhydrocinnamoyloxy)ethyl] isocyanurate,
3,5-di-(3,5-di-tert-butyl-4-hydroxybenzyl)mesitol,
hexamethylene bis(3,5-di-tert-butyl-4-hydroxyhydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzylphosphonate),
ethylene bis[3,3-di(3-tert-butyl-4-hydroxyphenyl) butyrate],
octyl 3,5-di-tert-butyl-4-hydroxybenzylmercaptoacetate,
bis(3,5-di-tert-butyl-4-hydroxyhydrocinnamoyl) hydrazide, N,N'-bis[2-(3,5-di-tert-butyl-4-hydroxyhydrocinnamoyloxy)-ethyl]oxamide,
N,N-di-($C_{12}$–$C_{24}$alkyl)-N-methyl-amine oxide, of
N,N-dialkylhydroxylamine prepared from di(hydrogenated tallow)amine by direct oxidation.

Still other embodiments of antioxidants useful in the instant invention are
neopentanetetrayl tetrakis(3,5-di-tert-butyl-4-hydroxyhydrocinnamate),
n-octadecyl 3,5-di-tert-butyl-4-hydroxyhydrocinnamate,
1,3,5-trimethyl-2,4,6-tris(3,5-di-tert-butyl-4-hydroxybenzyl)benzene,
1,3,5-tris(3,5-di-tert-butyl-4-hydroxybenzyl) isocyanurate,
2,6-di-tert-butyl-p-cresol, or
2,2'-ethylidene-bis(4,6-di-tert-butylphenol).

It should be noted that candles contain a host of various components. The base materials may be made up of the following:
paraffin wax,
natural oils,
polyamide plus fatty acid/ester,
fatty acids such as stearin,
opacifiers,
beeswax,
glycerides plus oxidized wax,
alcohols, and
ethylene oligomers.

Candles also contain a number of additives such as the following:
mold release agents,
fragrances,
insect repellants or insecticides,
hardeners,
crystal modifiers,
clarifiers,
guttering reducers,
colorants,
f.p. control agents, stretchability improvers,
gelling agents,
extrusion aids, and
vortex reducers.

Each of the various components are meant to control or modify the properties of the candle to insure proper burning, reduce channelling, aid in uniform melting, and the like. The colorants and fragrances obviously are there to provide the proper color, scent or other aesthetic appeal.

Of increasing importance are the transparent gel candles which look like clear glass, but which burn like a classical candle. As is discussed in detail in U.S. Pat. No. 5,879,694, the relevant parts of which are incorporated herein by reference, these gel candles usually contain a copolymer selected from the group consisting of a triblock, radial block, diblock or multiblock copolymer classically made up of at least two thermodynamically incompatible segments containing both hard and soft segments. Typical of such block copolymers is KRATON® (Shell Chemical Co.) which consists of block segments of styrene monomer units and rubber monomer or comonomer units. The most common structure found in KRATON® D series is a linear ABA block with styrene-butadiene-styrene (SBS) or styrene-isoprene-styrene (SIS).

The following examples are meant for illustrative purposes only and are not to be construed to limit the instant invention in any manner whatsoever.

Raw Materials

Wax samples are supplied by the Candle-Lite Corporation. These samples contain dyes and fragrances.

The UV absorbers and hindered amine stabilizers are obtained from the Ciba Speciality Chemicals Corporation.

Sample Preparation

The wax samples obtained from the Candle-Lite Corporation already contain a dye and a fragrance (scent). In these cases, the wax is melted and the appropriate stabilizer(s) is (are) added and dissolved in the molten wax. The stabilized wax is then poured into five (5) 44 mm diameter aluminum pans giving five (5) wax disks.

Sample Exposure

Triplicate samples of each disk are exposed under a bank of six (6) cool-white fluorescent lamps (40 watts) or under a bank of six (6) UV lamps having a wavelength of 368 nm with the test samples being twelve (12) inches (30.48 cm) below the lamps.

Dye color fade (or color change) is measured by a Macbeth ColorEye Spectrophotometer with a 6 inch integrating sphere. The conditions are: 10 degree observer; D65 illuminant and 8 degree viewing angle.

Initial color measurements are taken using the above parameters. The L, a and b values are calculated using the CIE system from the reflectance values. YI is calculated from the L, a and b values. Subsequent measurements are taken at specified intervals. Delta L, a, b and YI values are simply the difference between the initial values and the values at each interval. Delta($\Delta$) E is calculated as follows:

$$[(\text{Delta } L)^2 + (\text{Delta } a)^2 + (\text{Delta } b)^2]^{1/2} = \text{Delta } E.$$

EXAMPLE 1

2,2-Pentamethylene-5,5-pentamethylene-imidazolidin-4-one

The title compound is prepared according to the procedure given in J. Organic Chemistry, 28, 3576 (1963).

EXAMPLE 2

Color Fade of White Scented Candle Wax under Fluorescent Lamp Exposure

A variety of different stabilizers are evaluated in white scented candle wax obtained from the Candle-Lite Corporation under fluorescent lamp exposure. The $\Delta E$ values represent the change in color after the indicated days of exposure. A low $\Delta E$ value indicates less change in color and is highly desired.

| Sample* (wt % add) | $\Delta E$ after 28 days |
| --- | --- |
| Blank (no add) | 34.05 |
| A (0.3%) | 30.28 |
| A (0.15%) + D (0.15%) | 29.49 |
| D (0.3%) | 31.20 |
| B (0.15%) + D (0.15%) | 24.23 |
| B (0.15%) + C (0.15%) | 20.10 |
| F (0.15%) + C (0.15%) | 15.63 |
| F (0.15%) + A (0.15%) | 13.07 |
| F (0.15%) + E (0.15%) | 11.26 |

*A is octyl 3-(benzotriazol-2-yl)-5-tert-butyl-4-hydroxyhydrocinnamate, TINUVIN® 384, CIBA.
B is 2-(2-hydroxy-5-tert-octylphenyl)-2H-benzotriazole, TINUVIN® 329, CIBA.
C is 4-octyloxy-2-hydroxybenzophenone, CHIMMASORB® 81, CIBA.
D is bis(1,2,2,6,6-pentamethylpiperidin-4-yl) sebacate, TINUVIN® 292, CIBA.
E is the reaction product of 2,4,6-tris(2,4-dihydroxyphenyl)-s-triazine with octyl α-haloacetate.
F is 2,2-pentamethylene-5,5-pentamethylene-imidazolidin-4-one, the compound of instant Example 1.

These data show that an imidazolidine compound (Compound F) in combination with a UV absorber protects the white scented candle wax from unwanted discoloration far better than conventional stabilizer systems.

EXAMPLE 3

Color Fade of White Scented Candle Wax under UV Lamp Exposure

A variety of different stabilizers are evaluated in white scented candle wax obtained from the Candle-Lite Corporation under UV lamp exposure. The $\Delta E$ values represent the change in color after the indicated days of exposure. A low $\Delta E$ value indicates less change in color and is highly desired.

| Sample* (wt % add) | $\Delta E$ after 25 days |
| --- | --- |
| Blank (no add) | 45.09 |
| D (0.3%) | 32.03 |
| A (0.15%) + D (0.15%) | 29.74 |
| B (0.15%) + C (0.15%) | 30.11 |
| A (0.3%) | 25.50 |
| F (0.15%) + E (0.15%) | 15.51 |

*A is octyl 3-(benzotriazol-2-yl)-5-tert-butyl-4-hydroxyhydrocinnamate, TINUVIN® 384, CIBA.
B is 2-(2-hydroxy-5-tert-octylphenyl)-2H-benzotriazole, TINUVIN® 329, CIBA.
C is 4-octyloxy-2-hydroxybenzophenone, CHIMMASORB® 81, CIBA.
D is bis(1,2,2,6,6-pentamethylpiperidin-4-yl) sebacate, TINUVIN® 292, CIBA.
E is the reaction product of 2,4,6-tris(2,4-dihydroxyphenyl)-s-triazine with octyl α-haloacetate.
F is 2,2-pentamethylene-5,5-pentamethylene-imidazolidin-4-one, the compound of instant Example 1.

These data show that an imidazolidine compound (Compound F) in combination with a UV absorber protects the white scented candle wax from unwanted discoloration far better than conventional stabilizer systems.

EXAMPLE 4

Color Fade of Gray Scented Candle Wax under Fluorescent Lamp Exposure

A variety of different stabilizers are evaluated in gray scented candle wax obtained from the Candle-Lite Corporation under fluorescent lamp exposure. The ΔE values represent the change in color after the indicated days of exposure. A low ΔE value indicates less change in color and is highly desired.

| Sample* (wt % add) | ΔE after 41 days |
|---|---|
| Blank (no add) | 17.73 |
| A (0.3%) | 13.71 |
| B (0.15%) + C (0.15%) | 11.54 |
| F (0.15%) + C (0.15%) | 9.95 |
| F (0.15%) + G (0.15%) | 9.89 |

*A is octyl 3-(benzotriazol-2-yl)-5-tert-butyl-4-hydroxyhydrocinnamate, TINUVIN ® 384, CIBA.
B is 2-(2-hydroxy-5-tert-Octylphenyl)-2H-benzotriazole, TINUVIN ® 329, CIBA.
C is 4-octyloxy-2-hydroxybenzophenone, CHIMMASORB ® 81, CIBA.
F is 2,2-pentamethylene-5,5-pentamethylene-imidazolidin-4-one, the compound of instant Example 1.
G is the mixture of 3,3;3,5;5,5-methylene-bis [2,4-bis(2,4-dimethylphenyl)]-6-[2-hydroxy-4-(3-butyloxy-2-hydroxypropoxyphenyl)]-s-triazine.

These data show that an imidazolidine compound (Compound F) in combination with an s-triazine UV absorber protects the gray scented candle wax from unwanted discoloration far better than conventional stabilizer systems.

EXAMPLE 5

Green scented candle wax is well stabilized by 0.2% by weight of dimethyl p-methoxybenzylidenemalonate, SANDUVOR® PR 25, in combination with 0.2% by weight of 2,2-pentamethylene-5,5-pentamethylene-imidazolidin-4-one-1-oxyl.

EXAMPLE 6

Yellow scented candle wax is well stabilized by 0.1% by weight of di(1,2,2,6,6-penta methylpiperidin-4-yl) p-methoxybenzylidenemalonate, SANDUVOR® PR 31, in combination with 0.1% by weight of 2,2,5,5-tetramethyl-1-(2-hydroxyethyl)-imidazolin-4-one.

EXAMPLE 7

Red unscented candle wax is well stabilized by 0.1% by weight of dimethyl di(p-chlorophenyl)methylenemalonate in combination with 0.1% by weight of 2,2,5,5-tetramethyl-4-oxoimidazoline-1-oxyl.

EXAMPLE 8

Red unscented candle wax is well stabilized by 0.2% by weight of dim ethyl di(p-methoxyphenyl)methylenemalonate in combination with 0.2% by weight of bis-[2-(2,2,5,5-tetramethyl-4-oxo-imidazolin-1-yl)ethyl] sebacate.

EXAMPLE 9

Red unscented candle wax is well stabilized by 0.1% by weight of 4,4'-dimethoxy-2,2'-dihydroxybenzophenone in combination with 0.1% by weight of 2,5-dimethyl-2,5-diisobutyl-4-oxoimidazoline-1-oxyl.

EXAMPLE 10

Red unscented candle wax is well stabilized by 0.2% by weight of 4-tert-butyl-phenyl 2-hydroxybenzoate in combination with 0.1% by weight of 2,2,5,5-tetramethyl-1-methyl-3-(2-hydroxyethyl)-imidazolin-4-one.

EXAMPLE 11

Yellow unscented candle wax is well stabilized by 0.2% by weight of 2-ethoxy-2-ethyloxanilide in combination with 0.1% by weight of (2,2,6,6-tetramethylpiperidine-1-oxyl)-4-spiro-2'-(4-oxoimidiazoline-1-oxyl)-5'-spiro-4-(2,2,6,6-tetramethylpiperidine-1-oxyl).

EXAMPLE 12

Yellow unscented candle wax is well stabilized by 0.2% by weight of 3-hydroxy-phenyl benzoate in combination with 0.2% by weight of 2,2,5,5-tetramethyl-1-methyl-3-[H (OCH$_2$CH$_2$)$_x$]-imidazolin-4-one where x is 2 to 21.

EXAMPLE 13

Blue unscented candle wax is well stabilized by 0.2% by weight of dodecyl 3-phenyl-3-methyl-α-cyanoacrylate in combination with 0.1% by weight of 2,5-dimethyl-2,5-diethyl-4-oxoimidazoline-1-oxyl.

EXAMPLE 14

Blue unscented candle wax is well stabilized by 0.2% by weight of dodecyl 3,3-diphenyl-α-cyanoacrylate in combination with 0.2% by weight of the transesterification product of a 1:1 methyl methacrylate:ethyl acrylate copolymer with 3-hydroxyethyl-2,2,5,5-tetramethylimidazolidin-4-one.

EXAMPLE 15

Yellow scented candle wax is well stabilized by 0.2% by weight of 2-{2-hydroxy-3-tert-butyl-5-[2-(omega-hydroxy-octa(ethyleneoxy)carbonyl)ethyl]phenyl}-2H-benzotriazole, TINUVIN® 1130, CIBA, in combination with 2% by weight of the transesterification product of a 2:1 methyl methacrylate:ethyl acrylate copolymer with 3-hydroxyethyl-2,2,5,5-tetramethylimidazolidin-4-one.

EXAMPLE 16

Yellow scented candle wax is well stabilized by 0.1% by weight of 2-[2-hydroxy-3-(α,α-dimethylbenzyl)-5-tert-octylphenyl]-2H-benzotriazole, TINUVIN® 928, CIBA, in combination with 0.2% by weight of 2,2-[(1-methyl)-1,5-pentanediyl]-5,5-[(1-methyl)-1,5-pentanediyl]-imidazolidin-4-one-1-oxyl.

EXAMPLE 17

Red scented candle wax is well stabilized by 0.1% by weight of 5-chloro-2-(2-hydroxy-3-tert-butyl-5-methylphenyl)-2H-benzotriazole, TINUVIN® 326, CIBA, in combination with 0.1% by weight of 2,2,5,5-tetramethyl-1-methyl-3-[heptadecylcarbonyl-(OCH$_2$CH$_2$)$_x$]-imidazolin-4-one where x is 2 to 21.

EXAMPLE 18

Green scented candle wax is well stabilized by 0.1% by weight of octyl 3-(benzotriazol-2-yl)-5-tert-butyl-4- hydroxyhydrocinnamate, TINUVIN® 384, CIBA, in combination with 0.1% by weight of 2,2,5,5-tetramethyl-1-methyl-3-[4-hydroxy-3,5-di-tert-butylbenzoyl(OCH$_2$CH$_2$)$_x$]-imidazolin-4-one where x is 2 to 21.

EXAMPLE 19

Green scented candle wax is well stabilized by 0.1% by weight of octyl 3-(benzotriazol-2-yl)-5-tert-butyl-4-hydroxyhydrocinnamate, TINUVIN® 384, CIBA, in combination with 0.1% by weight of 2,2,5,5-tetramethyl-1-methyl-3-[2-(heptadecyl-carbonyloxyethyl]-imidazolin-4-one.

EXAMPLE 20

Blue scented candle wax is well stabilized by 0.1% by weight of 2-(2-hydroxy-5-tert-octylphenyl-2H-benzotriazole, TINUVIN® 329, CIBA, in combination with 0.1% by weight of 2,2,5,5-tetramethyl-3-methyl-1-[2-(heptadecylcarbonyloxyethyl]-imidazolin-4-one.

EXAMPLE 21

Blue scented candle wax is well stabilized by 0.2% by weight of 4-octyloxy-2-hydroxybenzophenone in combination with 0.1% by weight of 2,2-pentamethylene-5,5-pentamethylene-imidazolidin-4-one-1-oxyl.

EXAMPLE 22

Red unscented candle wax is well stabilized by 0.2% by weight of 2-ethylhexyl p-methoxycinnamate in combination with 0.1% by weight of 2,2-pentamethylene-5,5-pentamethylene-imidazolidin-4-one.

EXAMPLE 23

Red unscented candle wax is well stabilized by 0.1% by weight of 4,4'-dimethoxy-2,2'dihydroxybenzophenone in combination with 0.1% by weight of the transesterification product of a 1:1 methyl methacrylate:ethyl acrylate copolymer with 3-hydroxyethyl-2,2,5,5-tetramethylimidazolidin-4-one.

EXAMPLE 24

Yellow unscented candle wax is well stabilized by 0.1% by weight of 2-ethoxy-2'-ethyl-5,4'-di-tert-butyloxanilide in combination with 0.1% by weight of 2,2-penta-methylene-5,5-pentamethylene-imidazolidin-4-one.

EXAMPLE 25

Yellow unscented candle wax is well stabilized by 0.1% by weight of 2,4-bis(2,4-dimethylphenyl)-6-[2-hydroxy-4-(3-do-/tri-decyloxy-2-hydroxypropoxy)-phenyl]-s-triazine, TINUVIN® 400, CIBA, in combination with 0.1% by weight of the transesterification product of a 2:1 methyl methacrylate:ethyl acrylate copolymer with 3-hydroxyethyl-2,2,5,5-tetramethylimidazolidin-4-one.

EXAMPLE 26

Blue scented candle wax is well stabilized by 0.1% by weight of 2,4-bis(2,4-dimethylphenyl)-6-[2-hydroxy-4-(3-do-/tri-decyloxy-2-hydroxypropoxy)-5-α-cumylphenyl]-s-triazine in combination with 0.1% by weight of (2,2,6,6-tetramethylpiperidine-1-oxyl)-4-spiro-2'-(4-oxoimidiazoline-1-oxyl)-5'-spiro-4-(2,2,6,6-tetramethylpiperidine-1-oxyl).

EXAMPLE 27

Blue unscented candle wax is well stabilized by 0.2% by weight of 2,4-bis-(2,4-dimethylphenyl)-6-(2-hydroxy-4-octyloxyphenyl)-s-triazine in combination with 0.1% by weight of 1-acetyl-2,2,6,6-tetramethyl-4,4-(1-oxa-2,4-dioxo-3-dodecylimino-tetramethylene)piperidine, TINUVIN® 440, CIBA, an d 0.1% by weight of bis-[2-(2,2,5,5-tetramethyl-4-oxo-imidazolin-1-yl)ethyl] sebacate.

EXAMPLE 28

Blue unscented candle wax is well stabilized by 0.1% by weight of 2,4-bis(2,4-dimethylphenyl)-6-[2-hydroxy-4-(3-do-/tri-decyloxy-2-hydroxypropoxy)-phenyl]-s-triazine, TINUVIN® 400, CIBA, in combination with 0.1% by weight of bis(1,2,2,6,6-pentamethylpiperidin-4-yl) sebacate, TINUVIN® 292, Ciba, and 0.1% by weight of 2,2,5,5-tetramethyl-1-methyl-3-[4-hydroxy-3,5-di-tert-butylbenzoyl-(OCH$_2$CH$_2$)$_x$]-imidazolin-4-one where x is 2 to 21.

EXAMPLE 29

White unscented candle wax is well stabilized by 0.1% by weight of 4-tert-octyl-phenyl2-hydroxybenzoate in combination with 2% by weight of 2,2,5,5-tetramethyl-4-oxoimidazoline-1-oxyl.

EXAMPLE 30

White unscented candle wax is well stabilized by 0.1% by weight of 3-hydroxy-phenyl benzoate in combination with 0.1% by weight of octyl 3-(benzotriazol-2-yl)-5-tert-butyl-4-hydroxyhydrocinnamate, TINUVIN® 384, CIBA, and 0.1% by weight of 2,2,5,5-tetramethyl-1-methyl-3-[2-(heptadecylcarbonyloxyethyl]-imidazolin-4-one.

EXAMPLE 31

Yellow scented candle wax is well stabilized by 0.1% by weight of dodecyl 3,3-diphenyl-α-cyanoacrylate in combination with 0.1% by weight of 2,4-bis(2,4-dimethylphenyl)-6-[2-hydroxy-4-(3-do-/tri-decyloxy-2-hydroxypropoxy)-phenyl]-s-triazine, TINUVIN® 400, CIBA, and 0.1% by weight of 2,2-[(1-methyl)-1,5-pentanediyl]-5,5-[(1-methyl)-1,5-pentanediyl]-imidazolidin-4-one-1-oxyl.

EXAMPLE 32

Yellow scented candle wax is well stabilized by 0.1% by weight of pentaerythrityl tetrakis[3,3-diphenyl-α-cyanoacrylate] in combination with 0.2% by weight of bis-[2-(2,2,5,5-tetramethyl-4-oxo-imidazolin-1-yl)ethyl] sebacate.

EXAMPLE 33

Red scented candle wax is well stabilized by 0.2% by weight of octyl 3-(p-methoxyphenyl)-3-phenyl-α-cyanoacrylate in combination with 0.2% by weight of 2,2-pentamethylene-5,5-pentamethylene-imidazolidin-4-one.

What is claimed is:
1. A composition which consists essentially of
   (a) candle wax which is white and unscented; white and scented; dyed and unscented; dyed and scented; dipped and unscented; or dipped and scented, and
   (b) an effective stabilizing amount of a combination of
      (i) an imidazolidine compound and
      (ii) a UV absorber or an antioxidant, or a UV absorber and an antioxidant, wherein the ratio by weight of (i) to (ii) is from 10:1 to 1:10, and wherein the imidazolidine compound is of formula (Ia)

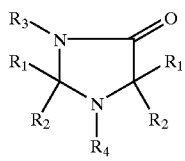
(Ia)

where

R$_1$ and R$_2$ are independently alkyl of 1 to 8 carbon atoms, or R$_1$ and R$_2$ together are tetramethylene, pentamethylene or pentamethylene substituted by methyl; and R$_3$ and R$_4$ are independently hydrogen, oxyl, hydroxyl, aralkyl of 7 to 15 carbon atoms, alkoxy of 1 to 24 carbon atoms, alkyl of 1 to 42 carbon atoms, said alkyl substituted by one or two hydroxyl groups, said alkyl substituted by alkylcarbonyloxy of 2 to 18 carbon atoms, or said alkyl interrupted by one to twenty oxygen atoms and substituted by one hydroxyl, by alkylcarbonyloxy of 2 to 18 carbon atoms or by 4-hydroxy-3,5-di-tert-butylbenzoyloxy.

2. A composition according to claim 1 wherein the composition also contains an antioxidant.

3. A composition according to claim 1 where in the compound of formula (Ia), R$_1$ and R$_2$ are each methyl, or R$_1$ and R$_2$ together are pentamethylene.

4. A composition according to claim 1 wherein the imidazolidine compound is (a) 2,2-pentamethylene-5,5-pentamethylene-imidazolidin-4-one;

(b) 2,2-pentamethylene-5,5-pentamethylene-imidazolidin-4-one-1-oxyl;

(c) 2,2,5,5-tetramethyl-4-oxoimidazoline-1-oxyl;

(d) 2,5-dimethyl-2,5-diisobutyl-4-oxoimidazoline-1-oxyl;

(e) (2,2,6,6-tetramethylpiperidine-1-oxyl)-4-spiro-2'-(4-oxoimidiazoline-1-oxyl)-5'-spiro-4-(2,2,6,6-tetramethylpiperidine-1-oxyl);

(f) 2,5-dimethyl-2,5-diethyl-4-oxoimidazoline-1-oxyl;

(g) 2,2-[(1-methyl)-1,5-pentanediyl]-5,5-[(1-methyl)-1,5-pentanediyl]-imidazolidin-4-one-1-oxyl;

(h) 2,2,5,5-tetramethyl-1-(2-hydroxyethyl)-imidazolin-4-one;

(i) bis-[2-(2,2,5,5-tetramethyl-4-oxo-imidazolin-1-yl) ethyl] sebacate;

(j) 2,2,5,5-tetramethyl-1-methyl-3-(2-hydroxyethyl)-imidazolin-4-one;

(k) 2,2,5,5-tetramethyl-1-methyl-3-[H(OCH$_2$CH$_2$)$_x$]-imidazolin-4-one where x is 2 to 21;

(l) 2,2,5,5-tetramethyl-1-methyl-3-[heptadecylcarbonyl (OCH$_2$CH$_2$)$_x$]-imidazolin-4-one where x is 2 to 21;

(m) 2,2,5,5-tetramethyl-1-methyl-3-[4-hydroxy-3,5-di-tert-butylbenzoyl(OCH$_2$CH$_2$)$_x$]-imidazolin-4-one where x is 2 to 21;

(n) 2,2,5,5-tetramethyl-1-methyl-3-[2-(heptadecylcarbonyloxyethyl]-imidazolin-4-one;

(o) 2,2,5,5-tetramethyl-3-methyl-1-[2-(heptadecylcarbonyloxyethyl]-imidazolin-4-one;

(p) the transesterification product of a 1:1 methyl methacrylate:ethyl acrylate copolymer with 3-hydroxyethyl-2,2,5,5-tetramethylimidazolidin-4-one; or (q) the transesterification product of a 2:1 methyl methacrylate:ethyl acrylate copolymer with 3-hydroxyethyl-2,2,5,5-tetramethylimidazolidin-4-one.

5. A composition according to claim 4 wherein the imidazolidine compound is 2,2-pentamethylene-5,5-pentamethylene-imidazolidin-4-one.

6. A composition according to claim 1 wherein the ratio by weight of (i) to (ii) is from 4:1 to 1:4.

7. A composition according to claim 6 wherein the ratio by weight of (i) to (ii) is from 2:1 to 1:2.

8. A composition according to claim 1 wherein the effective amount of the UV absorber plus the imidazolidine compound in the candle wax is 0.01 to 10% by weight based on the wax.

9. A composition according to claim 8 wherein the effective amount of the UV absorber plus imidazolidine in the candle wax is 0.1 to 2% by weight based on the wax.

10. A composition according to claim 9 wherein the effective amount of the UV absorber plus imidazolidine in the candle wax is 0.1 to 0.5% by weight based on the wax.

11. A composition according to claim 1 wherein the UV absorber of component (ii) is a benzotriazole, a benzophenone, an α-cyanoacrylate, an oxanilide, an s-triazine, a cinnamate, a malonate, a benzoate or a salicylate, or a mixture thereof.

12. A composition according to claim 11 wherein the UV absorber is a benzotriazole, a benzophenone or an s-triazine.

13. A composition according to claim 11 wherein the UV absorber is (a) 4-octyloxy-2-hydroxybenzophenone;

(b) 4-methoxy-2-hydroxybenzophenone;

(c) 2-(2-hydroxy-5-methylphenyl)-2H-benzotriazole;

(d) 2-(2-hydroxy-5-tert-octylphenyl)-2H-benzotriazole;

(e) 2-(2-hydroxy-3,5-di-tert-amylphenyl)-2H-benzotriazole;

(f) octyl 3-(benzotriazol-2-yl)-5-tert-butyl-4-hydroxyhydrocinnamate;

(g) 2-(2-hydroxy-3,5-di-tert-butylphenyl)-2H-benzotriazole;

(h) 2-(2-hydroxy-5-tert-butylphenyl)-2H-benzotriazole;

(i) 5-chloro-2-(2-hydroxy-3,5-di-tert-butylphenyl)-2H-benzotriazole;

(j) 5-chloro-2-(2-hydroxy-3-tert-butyl-5-methylphenyl)-2H-benzotriazole;

(k) 2-(2-hydroxy-3-sec-butyl-5-tert-butylphenyl)-2H-benzotriazole;

(l) 2-(2-hydroxy-4-octyloxyphenyl)-2H-benzotriazole;

(m) 2-(2-hydroxy-3-dodecyl-5-methylphenyl)-2H-benzotriazole;

(n) 2-[2-hydroxy-3,5-(α,α-dimethylbenzyl)phenyl]-2H-benzotriazole;

(o) 2-[2-hydroxy-3-(α,α-dimethylbenzyl)-5-tert-octylphenyl]-2H-benzotriazole;

(p) 2-{2-hydroxy-3-tert-butyl-5-[2-(omega-hydroxy-octa (ethyleneoxy)carbonyl)ethyl]phenyl}-2H-benzotriazole; and (q) 2-{2-hydroxy-3-tert-butyl-5-[2-(octyloxy)carbonyl) ethyl]phenyl}-2H-benzotriazole;

(r) 2-ethylhexyl p-methoxycinnamate;

(s) 4-methoxy-2,2'-dihydroxybenzophenone;

(t) 4,4'dimethoxy-2,2'-dihydroxybenzophenone;

(u) 2,4-bis(2,4-dimethylphenyl)-6-(2-hydroxy-4-octyloxyphenyl)-s-triazine;

(v) 2,4-diphenyl-6-(2-hydroxy-4-hexyloxyphenyl)-s-triazine;

(w) 2,4-bis(2,4-dimethylphenyl)-6-[2-hydroxy-4-(3-do-/tri-decyloxy-2-hydroxypropoxy)phenyl]-s-triazine; (x) 2,4-bis(2,4-dimethylphenyl)-6-[2-hydroxy-4-(3-do-/tri-decyloxy-2-hydroxypropoxy)-5-α-cumylphenyl]-s-triazine;

(y) reaction product of 2,4,6-tris(2,4-dihydroxyphenyl)-s-triazine with octyl α-haloacetate; or (z) the mixture of 3,3;3,5;5,5-methylene-bis[2,4-bis(2,4-dimethylphenyl)]-6-[2-hydroxy-4-(3-butyloxy-2-hydroxypropoxyphenyl)]-s-triazine.

14. A composition according to claim 13 wherein the UV absorber is (a) 4-octyloxy-2-hydroxybenzophenone;

(b) 4-methoxy-2-hydroxybenzophenone;

(d) 2-(2-hydroxy-5-tert-octylphenyl-2H-benzotriazole;

(o) 2-[2-hydroxy-3-(α,α-dimethylbenzyl)-5-tert-octylphenyl]-2H-benzotriazole;

(p) 2-{2-hydroxy-3-tert-butyl-5-[2-(omega-hydroxy-octa(ethyleneoxy)carbonyl)-ethyl]phenyl}-2H-benzotriazole;

(q) 2-{2-hydroxy-3-tert-butyl-5-[2-(octyloxy)carbonyl)ethyl]phenyl}-2H-benzotriazole;

(y) reaction product of 2,4,6-tris(2,4-dihydroxyphenyl)-s-triazine with octyl α-haloacetate; or (z) the mixture of 3,3;3,5;5,5-methylene-bis[2,4-bis(2,4-dimethyl-phenyl)]-6-[2-hydroxy-4-(3-butyloxy-2-hydroxypropoxyphenyl)]-s-triazine.

15. A composition according to claim 2 wherein the antioxidant is n-octadecyl 3,5-di-tert-butyl-4-hydroxyhydrocinnamate, neopentanetetrayl tetrakis(3,5-di-tert-butyl-4-hydroxyhydrocinammate), di-n-octadecyl 3,5-di-tert-butyl-4-hydroxybenzylphosphonate, 1,3,5-tris(3,5-di-tert-butyl-4-hydroxybenzyl) isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl) isocyanurate, 1,1,3,-tris(2-methyl-4-hydroxy-5-tert-butylphenyl) butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl) butyrate], octyl 3,5-di-tert-butyl-4-hydroxybenzylmercaptoacetate, bis(3,5-di-tert-butyl-4-hydroxyhydrocinnamoyl) hydrazide, N,N'-bis[2-(3,5-di-tert-butyl-4-hydroxyhydrocinnamoyloxy)-ethyl]oxamide, N,N-di-($C_{14}$–$C_{24}$alkyl)-N-methylamine oxide, or N,N-dialkylhydroxylamine prepared from di(hydrogenated tallow)amine by direct oxidation.

16. A composition according to claim 2 wherein the antioxidant is a phenolic antioxidant, phosphite, nitrone, amine oxide or hydroxylamine, or mixture thereof.

17. A composition according to claim 1 wherein the effective amount of UV absorber in combination with the imidazolidine and an antioxidant is 0.01 to 10% by weight based on the wax.

18. A composition according to claim 17 wherein the effective amount of UV absorber in combination with the imidiazoline and an antioxidant is 0.1 to 2% by weight based on the wax.

19. A composition according to claim 18 wherein the effective amount of UV absorber in combination with the imidiazoline and an antioxidant is 0.1 to 0.5% by weight based on the wax.

20. A composition according to claim 15 wherein the antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl) isocyanurate, 2,6-di-tert-butyl-p-cresol, or 2,2'-ethylidene-bis(4,6-di-tert-butylphenol).

* * * * *